Feb. 21, 1950 — W. T. MAXANT — 2,498,564
HEDGE TRIMMER
Filed May 27, 1946 — 2 Sheets-Sheet 2

William T. Maxant
INVENTOR.

BY Cyrus Kehr & Swecker
his ATTORNEYS.

Patented Feb. 21, 1950

2,498,564

UNITED STATES PATENT OFFICE 2,498,564

HEDGE TRIMMER

William T. Maxant, Ayer, Mass.

Application May 27, 1946, Serial No. 672,577

3 Claims. (Cl. 30—208)

This invention relates to improvements in hedge trimmers, of the character used for the trimming of hedges, shrubs and other plants, and the like.

It is an improvement more particularly on the trimmer set forth in the Beloin patent, No. 1,778,995, granted October 21, 1930. The manufacture of the Beloin trimmer as set forth in said patent, has revealed certain defects in construction and a danger in use whereby it has not been entirely satisfactory.

The object of this invention is to improve the construction of hedge trimmers of this character both as to design and structure, and also as to safety characteristics to avoid danger of the accidental cutting of the hand or fingers of an operator in handling or using the trimmer.

It has been found that the structure of the trimmer can be improved materially both as to sturdiness and safety in the mounting of the movable blade, the operating means therefor, the locking of the blade in its retracted position, and the protecting of the blade in both of its extreme positions whereby danger of accidental cutting of the fingers is avoided. These and other improvements in the construction provide a much improved structure over the prior known trimmer.

A preferred embodiment of this invention is shown in the accompanying drawings, in which:

Fig. 3 is a cross-section on the line 3—3 of Fig. 1;

Fig. 4 is a similar view on the line 4—4 of Fig. 1;

Figure 1:
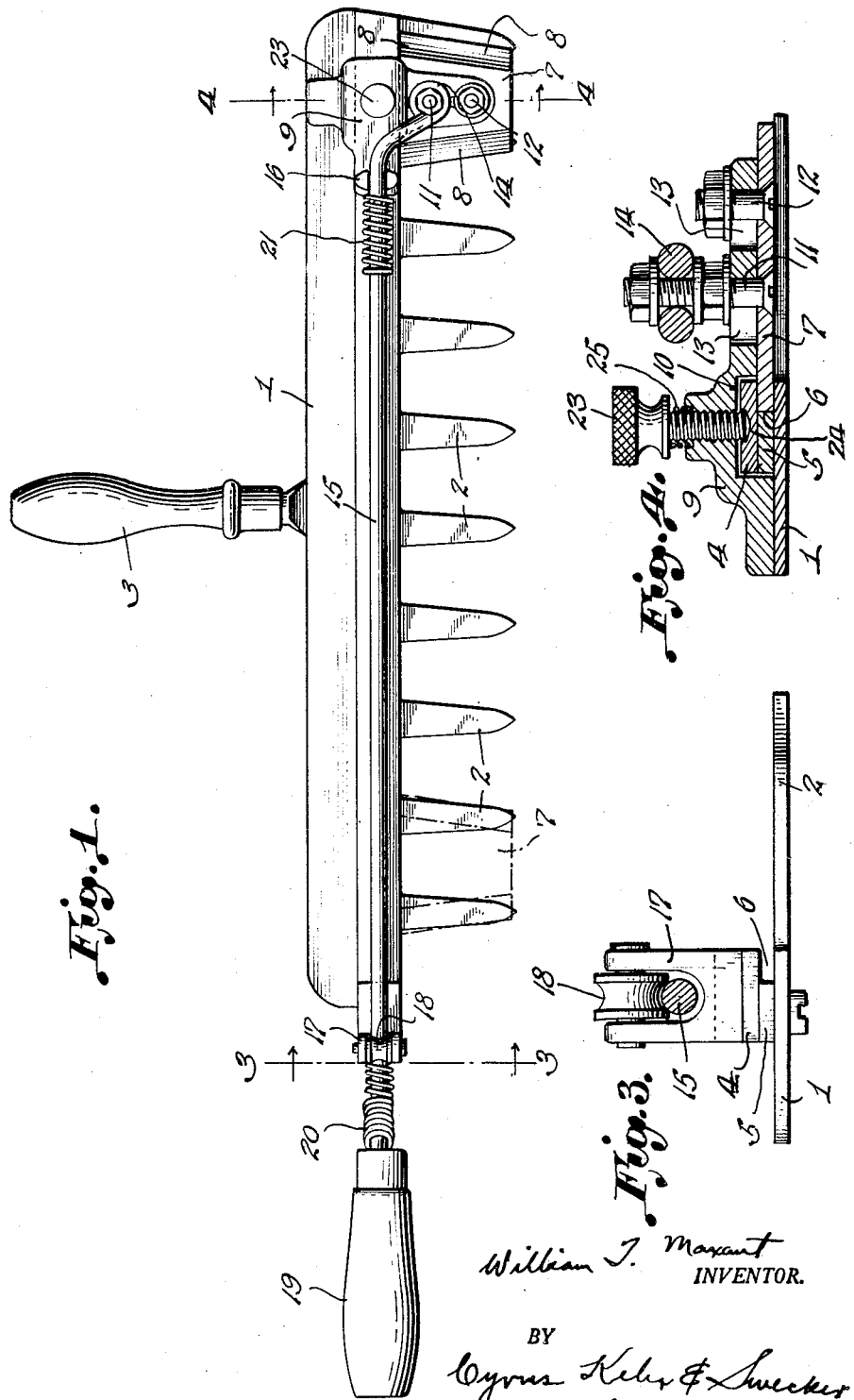
Fig. 1 is a top plan view of the trimmer.
Figure 2:
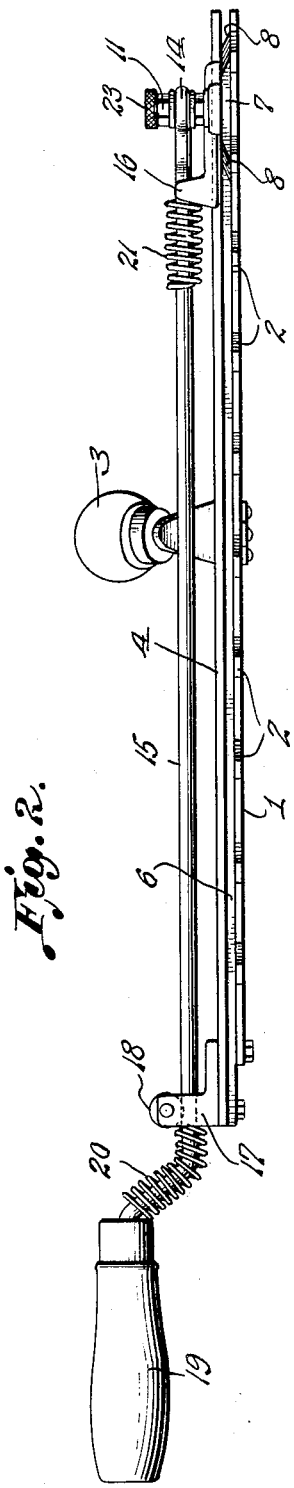
Fig. 2 is an edge view thereof in elevation.

The embodiment of the invention shown in the drawings utilizes an elongated base plate generally indicated at 1, preferably formed of steel and having a series of comb teeth 2 formed integral therewith along one edge of the plate. The teeth 2 should be sufficient in number and properly spaced to accommodate the length of travel of the blade hereinafter described and to receive therebetween and hold the portions of hedge or other foliage to be trimmed.

Approximately midway of its length the base plate 1 is provided with a supporting handle 3 which extends laterally from the plate 1 and is permanently secured thereto.

Extending lengthwise of the plate 1 substantially throughout the length thereof is a track 4 held in elevated position above the plate 1 by a bar 5. One edge of the track 4 is shown as flush with the bar 5, as illustrated in Figs. 3 and 4, while the bar 5 is of less width than the track 4 to provide a guideway 6 between the projecting edge of the track 4 and the adjacent edge of the plate 1. The parts 4 and 5 are secured permanently in rigid relationship to the plate 1 as by rivets or other means of fastening, as desired.

The cutter blade is shown at 7, preferably sharpened at both opposite edges thereof, as indicated at 8. These edges 8 are arranged as converging in an outward direction to facilitate the shearing of the foliage retained between the comb teeth 2. The teeth 2 are so disposed preferably that they will protect both opposite edges of the blade 7 when the blade is in either extreme position of movement, as indicated respectively in its full line and dotted line positions in Fig. 1. The inner end of the blade 7 extends into the guideway 6 and is slidably mounted therein, as shown in Fig. 4.

The blade 7 is carried by a slide 9, shown as formed of a casting having a groove 10 on the under side thereof to embrace the track 4 and ride thereon. The slide 9 is elongated transversely of the plate 1 and extends in overlapping relation throughout the major portion of the length of the blade 7. It is secured to the blade by bolts 11 and 12 extending through slots 13 in the blade for adjustment of the latter.

The bolt 11 is elongated and is secured at its projecting end in an eye 14 formed at one offset end of a rod 15. The rod 15 extends lengthwise over the track 4 and its offset end is received in a yoke 16 that upstands from one edge of the slide casting 9 to form a secure connection between the casting and the rod whereby these are substantially rigid with respect to each other.

Figure 5:
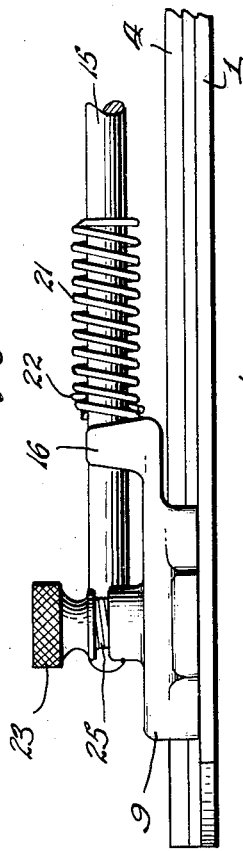
Fig. 5 is a detail edge view of the guide and slide at the opposite edge of Fig. 2.

The opposite end of the rod 15 extends through a guide bracket 17 beneath a roller 18 journaled in said bracket and has a handle 19 secured on the extreme end thereof. A coiled spring 20 is sleeved over the end portion of the rod 15 externally of the bracket 17 to cushion the movement of the rod in its forward direction toward the position shown in full lines in the drawings. A similar coiled spring 21 is sleeved over the rod 15 and is retained in place thereon by a cotter pin 22 (Fig. 5). One end of the coiled spring 21 bears against the yoke 16 while the opposite end is free and in position to engage the bracket 17 upon the outward movement of the blade by the handle 19 to cushion the stopping action in said outward direction.

Figure 6:
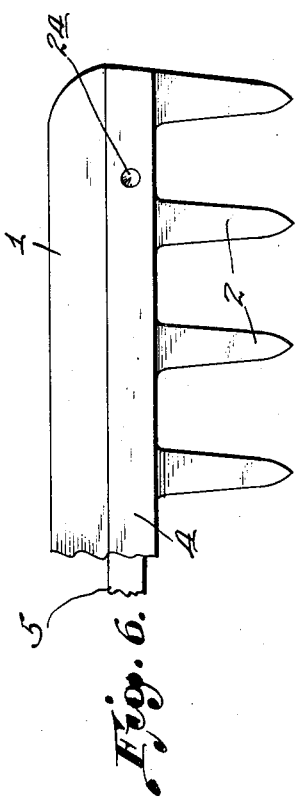
Fig. 6 is a top plan view of the base and guide of the trimmer.

The blade 7 is adapted to be reciprocated between the positions shown in full lines and in dotted lines in Fig. 1. It will be evident that the blade is protected by spaced comb teeth 2 at both of its opposite edges in each of said positions whereby the edges of the blade are so protected that accidental injury to the hands or fingers of the user is avoided either in handling or in using the trimmer. Moreover when the trimmer is not in use the blade 7 is preferably retained in its retracted position by a set-screw 23 threaded through the slide 9 and with a pointed end in position to engage a recess 24 in the upper face of the track 4, as shown in Fig. 6. A coiled spring 25 is sleeved around the set-screw 23, as shown in Fig. 4, to facilitate the unscrewing thereof when it is desired to release the slide for reciprocating movement.

The operation of the trimmer will be evident from the foregoing description. With the set-screw 23 released, the operator holds the trimmer in one hand by the handle 3 while he manipulates the blade 7 with the opposite hand engaging the handle 19. Upon presenting the comb teeth 2 to the foliage or other plant to be trimmed the operator may readily reciprocate the blade 7 between the extreme positions shown, thus shearing off the foliage by the cutting edges of the blade as the foliage is held between the teeth.

The construction is much improved by the sturdy and rigid mounting of the blade for reciprocating movement and also by the protection of the blade against accidental injury in both extreme positions and also when it is retained in its secured retracted position when the trimmer is not in use.

While the invention is illustrated in one embodiment, it is appreciated that variations and changes may be made in the construction without departing from the invention, except as specified in the claims.

I claim:

1. A trimmer of the character described comprising an elongated base plate having laterally projecting teeth thereon and spaced apart lengthwise of the plate, a track extending lengthwise of the plate, a cutter blade having opposite cutting edges said cutter blade having a configuration and size approximately equal to the outer extremities of a pair of said teeth on the base plate, means connected with the blade for guiding the blade along the track in reciprocating movements, and means for stopping the movements of the blade adjacent opposite ends of the track with the cutting edges of the blade in overlapping relation and in a protected position with respect to the end pair of cutting teeth on said base plate.

2. A trimmer of the character described comprising an elongated base plate having laterally projecting teeth thereon and spaced apart lengthwise of the plate, a track extending lengthwise of the plate, a cutter blade having opposite cutting edges said cutter blade having a configuration and size approximately equal to the outer extremities of a pair of said teeth on the base plate, means connected with the blade for guiding the blade along the track in reciprocating movements, means for reciprocating the blade lengthwise of the track between extreme positions at opposite end portions of the track, and means for stopping the movement of the blade in its extreme positions at opposite ends of the track with the opposite cutting edges of the blade in overlapping and protected positions relative to a pair of spaced teeth at each opposite end of the track.

3. A trimmer of the character described comprising an elongated base plate having laterally projecting teeth thereon and spaced apart lengthwise of the plate, a track extending lengthwise of the plate, a cutter blade having opposite cutting edges said cutter blade having a configuration and size approximately equal to the outer extremities of a pair of said teeth on the base plate, means connected with the blade for guiding the blade along the track in reciprocating movements, means for reciprocating the blade lengthwise of the track between extreme positions at opposite end portions of the track, means for stopping the movement of the blade in its extreme positions at opposite ends of the track with the opposite cutting edges of the blade in overlapping and protecting positions relative to a pair of spaced teeth at each opposite end of the track, and means for locking the blade against reciprocating movement relative to the track in one extreme position thereof.

WILLIAM T. MAXANT.

REFERENCES CITED

The following references are of record in the file of this patent:

UNITED STATES PATENTS

| Number | Name | Date |
|---|---|---|
| 1,124,824 | Walter | Jan. 12, 1915 |
| 1,397,923 | Crosby | Nov. 22, 1921 |
| 1,778,995 | Beloin | Oct. 21, 1930 |
| 1,842,724 | Langsner | Jan. 26, 1932 |

FOREIGN PATENTS

| Number | Country | Date |
|---|---|---|
| 347,746 | France | Jan. 16, 1905 |